(12) United States Patent
Komashinskiy et al.

(10) Patent No.: US 12,513,173 B2
(45) Date of Patent: Dec. 30, 2025

(54) THREAT DETECTION NETWORK

(71) Applicant: WithSecure Corporation, Helsinki (FI)

(72) Inventors: Dmitriy Komashinskiy, Helsinki (FI); Paolo Palumbo, Helsinki (FI); Matti Aksela, Helsinki (FI)

(73) Assignee: WITHSECURE CORPORATION, Helsinki (FI)

( * ) Notice: Subject to any disclaimer, the term of this patent is extended or adjusted under 35 U.S.C. 154(b) by 240 days.

(21) Appl. No.: 18/325,408

(22) Filed: May 30, 2023

(65) Prior Publication Data

US 2023/0388328 A1    Nov. 30, 2023

(30) Foreign Application Priority Data

May 31, 2022   (EP) ..................................... 22176386

(51) Int. Cl.
*H04L 9/40*     (2022.01)
*G06F 15/16*    (2006.01)
(Continued)

(52) U.S. Cl.
CPC .......... *H04L 63/1425* (2013.01); *H04L 41/22* (2013.01)

(58) Field of Classification Search
CPC . H04L 63/1425; H04L 41/22; H04L 63/1416; H04L 67/10; H04L 67/2895;
(Continued)

(56) References Cited

U.S. PATENT DOCUMENTS

2016/0078356 A1* 3/2016 Dang ....................... G06N 5/04
                                                            706/47
2016/0371489 A1* 12/2016 Puri ...................... G06F 16/254
(Continued)

FOREIGN PATENT DOCUMENTS

EP          3799385 A1 *  3/2021  ............. G06N 20/00
WO    WO-2022035578 A1 *  2/2022  ......... G06F 16/9024

OTHER PUBLICATIONS

Search Report for EP22176386, completed Nov. 11, 2022, 2 pages.

*Primary Examiner* — Emmanuel L Moise
*Assistant Examiner* — Berhanu Shitayewoldetadik
(74) *Attorney, Agent, or Firm* — NIXON & VANDERHYE (57) ABSTRACT

Disclosed is a threat detection network for monitoring a security threat for a computer network, including a back end system and sensors coupled to the back end system, wherein each sensor: collects data describing respective predefined events in a respective node of the network, each event involving interaction of a subject entity operating in the respective node with an object entity associated with the node, applies predefined anomaly detection models to determine respective anomaly detection scores for interactions captured in the collected data, arranges the captured interactions into a local activity graph describing interactions of subject entities operating in the node with object entities associated with the node, and transmits portions of the local activity graph as status data to the back end system depending on the anomaly scores for the respective interactions captured in the local activity graph. The back end system derives security parameters describing security threats.

19 Claims, 3 Drawing Sheets

(51) Int. Cl.
  *G06F 16/901*   (2019.01)
  *G06F 17/30*    (2006.01)
  *G06F 21/62*    (2013.01)
  *H04L 15/16*    (2006.01)
  *H04L 41/22*    (2022.01)

(58) Field of Classification Search
  CPC . H04L 67/5651; G06F 21/552; G06F 21/554; G06F 21/577
  USPC .......................................................... 726/23
  See application file for complete search history.

(56) References Cited

U.S. PATENT DOCUMENTS

| | | | |
|---|---|---|---|
| 2020/0042700 A1* | 2/2020  | Li ........................... | G06F 21/554 |
| 2020/0396232 A1* | 12/2020 | Lee ...................... | G06F 11/3051 |
| 2021/0092129 A1* | 3/2021  | Aksela ................ | H04L 63/0209 |
| 2021/0406917 A1* | 12/2021 | Erickson ................ | G06N 3/084 |
| 2022/0067097 A1* | 3/2022  | Gupta ................. | G06F 21/6218 |

* cited by examiner

Collect, in a sensor, data that is descriptive of respective occurrences of one or more predefined events in a node of the computer network the sensor serves to monitor, wherein each of said events involves a respective interaction of a subject entity operating in the respectivce node with an object entity associated with the respective node

102

---

Apply, in the sensor, one or more predefined anomaly detection (AD) models to determine a respective anomaly detection score for a plurality of interactions captured in the collected data

104

---

Arrange, in the sensor, at least some of the interactions captured in the collected data into a local activity graph that is descriptive of interactions of one or more subject entities operating in the respective node with one or more object entities associated with the respective node

106

---

Selectively transmit, from the sensor, one or more portions of the local activity graph as respective node status data to a back end system in dependence of the anomaly detection scores determined for the respective interactions captured in the local activity graph

108

---

Derive, in the back end system based on the respective node status data received from one or more of a plurality of sensors, one or more security parameters that are descriptive of a security threat subjected to the computer network

110

---

Arrange at least part of the respective node status data received at the back end system into aggregate node status data for visual presentation to a user

Threat level 2    Threat level 4
Threat level 3    Threat level 5

THREAT DETECTION NETWORK

CROSS-REFERENCE TO RELATED APPLICATIONS

This application claims the priority under 35 USC 119(a) of EP patent application 22176386.5 filed on May 31, 2022, the entirety of which is incorporated herein by reference.

BACKGROUND OF THE INVENTION

Field of the Invention

The example and non-limiting embodiments of the present invention relate to a threat detection network such as an endpoint detection and response (EDR) system or an extended detection and response (XDR) system for monitoring security threats pertaining to a computer system or a computer network.

Description of the Related Art

Threat detection network solutions are applicable for detecting security threats pertaining to a computer system or a computer network via usage of sensor software executing in one or more endpoints of the monitored computer network, where the sensor software is arranged to collect data from the respective endpoints for transmission to a back end system to enable real-time analysis of a security status of the monitored computer system therein. Such an approach enables high quality attack detection, explanation and response services. Example of such threat detection network solutions include Endpoint Detection and Response (EDR) and Extended Detection and Response (XDR) solutions.

In order to provide a meaningful threat detection network, the back end system must have computational resources that enable processing of the data collected by the sensor software at the endpoints of the monitored computer system in real time. However, maintaining the capability to reliably detect continuously evolving cyber threats requires collecting and processing increasing volumes of data at the endpoints of the monitored computer network, while on the other hand increasing amounts of collected data and/or increasing size of the monitored computer network may result in unfeasibly high requirements for the computational resources of the back end system to enable continuous and/or real-time monitoring, thereby calling for enhanced solutions for collecting and processing the data within the threat detection network.

SUMMARY OF THE INVENTION

It is an object of the present invention to provide a threat detection network including a plurality of sensors arranged to collect data that is descriptive of operation of respective nodes of a computer network and a back end system for threat detection via analysis of the collected data that provides a robust, flexible and reliable way of identifying and/or inspecting security threats pertaining to the monitored computer network.

According to an example embodiment, a threat detection network for monitoring a security threat pertaining to a computer network is provided, the threat detection network comprising a back end system and a plurality of sensors coupled to the back end system via a communication network, wherein each sensor is arranged to: collect data that is descriptive of respective occurrences of one or more predefined events in a respective one of a plurality of nodes of the computer network, wherein each of said events involves a respective interaction of a subject entity operating in the respective node with an object entity associated with the respective node, apply one or more predefined anomaly detection models to determine respective anomaly detection scores for a plurality of interactions captured in the collected data, arrange at least some of the interactions captured in the collected data into a local activity graph that is descriptive of interactions of one or more subject entities operating in the respective node with one or more object entities associated with the respective node, and selectively transmit one or more portions of the local activity graph as respective node status data to the back end system in dependence of the anomaly scores determined for the respective interactions captured in the local activity graph; and wherein the back end system is arranged to derive, based on respective node status data received from one or more of said plurality of sensors, one or more security parameters that are descriptive of the security threat pertaining to the computer network.

According to another example embodiment, a method for monitoring a security threat pertaining to a computer network is provided, wherein the threat detection network comprises a back end system and a plurality of sensors coupled to the back end system via a communication network, wherein the method comprises, in said plurality of sensors, the following: collecting, in a respective sensor, data that is descriptive of respective occurrences of one or more predefined events in a respective one of a plurality of nodes of the computer network, wherein each of said events involves a respective interaction of a subject entity operating in the respective node with an object entity associated with the respective node, applying, in the respective sensor, one or more predefined anomaly detection models to determine a respective anomaly detection score for a plurality of interactions captured in the collected data, arranging, in the respective sensor, at least some of the interactions captured in the collected data into a local activity graph that is descriptive of interactions of one or more subject entities operating in the respective node with one or more object entities associated with the respective node, and selectively transmitting, from the respective sensor, one or more portions of the local activity graph as respective node status data to the back end system in dependence of the anomaly scores determined for the respective interactions captured in the local activity graph; and wherein the method further comprises deriving, in the back end system, based on respective node status data received from one or more of said plurality of sensors, one or more security parameters that are descriptive of the security threat pertaining to the computer network.

According to another example embodiment, a computer program for monitoring a security threat pertaining to a computer network is provided, wherein the threat detection network comprises a back end system and a plurality of sensors coupled to the back end system via a communication network, the computer program comprising computer instructions for causing one or more apparatuses to perform at least the method according to the example embodiment described in the foregoing when executed on one or more computer apparatuses.

The computer program according to the above-described example embodiment may be embodied on a volatile or a non-volatile computer-readable record medium, for example as a computer program product comprising at least one computer readable non-transitory medium having the program code stored thereon, which, when executed by one or more computing apparatuses, causes the computing apparatus(es) at least to perform the method according to the example embodiment described in the foregoing.

The exemplifying embodiments of the invention presented in this patent application are not to be interpreted to pose limitations to the applicability of the appended claims. The verb "to comprise" and its derivatives are used in this patent application as an open limitation that does not exclude the existence of also unrecited features. The features described hereinafter are mutually freely combinable unless explicitly stated otherwise.

Some features of the invention are set forth in the appended claims. Aspects of the invention, however, both as to its construction and its method of operation, together with additional objects and advantages thereof, will be best understood from the following description of some example embodiments when read in connection with the accompanying drawings.

BRIEF DESCRIPTION OF THE DRAWINGS

The embodiments of the invention are illustrated by way of example, and not by way of limitation, in the figures of the accompanying drawings, where.

DETAILED DESCRIPTION

Figure 1:
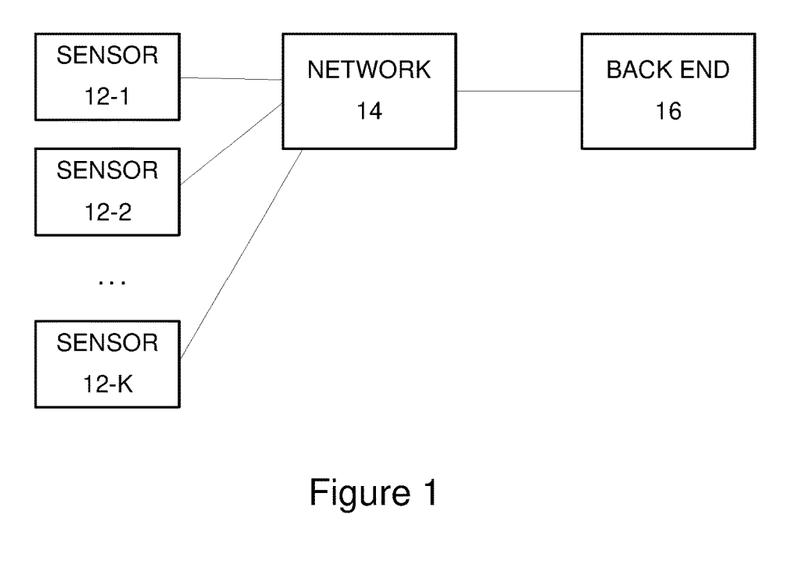
FIG. 1 illustrates a block diagram that depicts some components of a threat detection network according to an example.

FIG. 1 illustrates a block diagram that depicts some components of a threat detection network 10 according to an example. In this regard, the illustration of FIG. 1 includes sensors 12-1, 12-2, . . . , 12-K and a back end system 16. Herein, the sensors 12-1, 12-2, . . . , 12-K represent a plurality of sensors that may be jointly referred to via a reference number 12, whereas any individual sensor may be referred to via a reference number 12-$k$. The plurality of sensors 12 are communicatively coupled to the back end system 16 via a communication network 14. The threat detection network 10 may comprise, for example, an Endpoint Detection and Response (EDR) system or an Extended Detection and Response (XDR) system.

Each sensor 12-$k$ serves to monitor operation of a respective node of a computer network via capturing information that is descriptive of one or more predefined aspects of operation of the respective node. The sensor 12-$k$ may selectively transmit a portion of the captured information that is descriptive of operation of the respective node of the computer network to the back end system 16 for further processing and analysis therein. The information transmitted from the sensor 12-$k$ to the back end system 16 may be referred to as node status data pertaining to the respective node of the monitored computer network. The node monitored by the sensor 12-$k$ may comprise any computer apparatus that is connected or connectable to other devices via a communication network, e.g. the communication network 14. As non-limiting examples in this regard, the node may comprise an endpoint apparatus such as a desktop computer, a laptop computer, a tablet computer, a mobile phone, etc., a gateway apparatus, a server apparatus or a server system, etc. The sensor 12-$k$ may be embodied as software that is executable and/or executing in the computer apparatus of the node which the respective sensor 12-$k$ serves to monitor. Hence, in general, the sensor 12-$k$ may be provided via operation of an apparatus comprising a processor and a memory, where the memory is arranged to store computer program code that, when executed by the processor, causes the apparatus to implement operations described in the present disclosure for the sensor 12-$k$. More detailed examples of using the processor and the memory for implementing the sensor 12-$k$ are described later in this text with references to FIG. 5.

The back end system 16 may receive respective node status data from the plurality of sensors 12 and it may carry out an analysis of the respective node status data received from the plurality of sensors 12. In this regard, the back end system 16 may derive one or more security parameters that are descriptive of a threat level subjected to the computer network monitored by the plurality of sensors 12 and/or provide at least part of the node status data received from the plurality of sensors 12 or information derived therefrom for inspection by a human operation. The back end system 16 may comprise a computer apparatus or an arrangement of one or more computer apparatuses configured to implement operations described in the present disclosure for the back end system 16.

Hence, in general, the back end system 16 may be provided via operation of one or more apparatuses that each comprise a respective processor and a respective memory, where the memories in respective ones of the one or more apparatuses are arranged to store respective portions of computer program code that, when executed by the respective processors of the one or more apparatuses, cause the one or more apparatuses to jointly implement operations described in the present disclosure for the back end system 16. More detailed examples of using the processor and the memory for implementing any of the one or more computer apparatuses applied to provide the back end system 16 are described later in this text with references to FIG. 5.

At a high level, the plurality of sensors 12 and the back end system 16 may carry out a threat detection procedure via each of the plurality of sensors 12 continuously capturing information that is descriptive of one or more predefined aspects of operation of a respective node of the computer network the respective sensor 12-$k$ serves to monitor and selectively transmitting part of the captured information as the node status data to the back end system 16 and the back end system 16 deriving the one or more security parameters that are descriptive of a threat level subjected to the computer network monitored by the plurality of sensors 12. Operation of the threat detection network 10 may further involve the back end system 16 carrying out a further analysis based on the one or more security parameters, the back end system 16 providing at least part of the node status data received from the plurality of sensors 12 and/or information derived therefrom (such as the one or more security parameters) for automated analysis by a detection engine or another decision making entity, or the back end system 16 providing at least part of the node status data received from the plurality of sensors 12 and/or information derived therefrom (such as the one or more security parameters) for inspection by a human operator.

As an example of operation of the threat detection network 10, each sensor 12-$k$ and the back end system 16 may be involved in carrying out a method 100 illustrated in FIG. 2 and outlined in the following:

collecting, in the sensor 12-k, data that is descriptive of respective occurrences of one or more predefined events in a node of the computer network the sensor 12-k serves to monitor, wherein each of said events involves a respective interaction of a subject entity operating in the respective node with an object entity associated with the respective node (block 102);

applying, in the sensor 12-k, one or more predefined anomaly detection (AD) models to determine a respective anomaly detection score for the interactions captured in the collected data (block 104);

arranging, in the sensor 12-k, at least some of the interactions captured in the collected data into a local activity graph that is descriptive of respective interactions of one or more subject entities with one or more object entities (block 106);

selectively transmitting, from the sensor 12-k, one or more portions of the local activity graph as respective node status data to the back end system 16 in dependence of the anomaly detection scores determined for the respective interactions captured in the local activity graph (block 108); and deriving, in the back end system 16 based on the respective node status data received from one or more of the plurality of sensors 12, one or more security parameters that are descriptive of a security threat subjected to the monitored computer network (block 110).

Hence, the method 100 may be jointly implemented by the plurality of sensors 12 and the back end system 16 for continuous monitoring of security threats pertaining to the computer network under consideration in real-time and/or for subsequent analysis of security threats subjected to the monitored computer network. Respective operations described with references to the method steps represented by blocks 102 to 110 may be varied or complemented in a number of ways, e.g. according to the examples provided in the foregoing and/or in the following in context of describing respective characteristics of operation of the plurality of sensors 12 and the back end system 16 that serve as elements of the threat detection network according to the present disclosure. Moreover, the method 100 may be complemented with one or more additional steps, the order of carrying out at least some of the method steps may be different from that depicted in FIG. 2 and/or some of the steps may be omitted without departing from the scope of operation of the threat detection network described in the present disclosure.

Referring now back to the one or more predefined events (cf. r block 102 of FIG. 2), as described in the foregoing, the one or more predefined events monitored by the sensor 12-k include ones where a first entity operating in the respective node of the monitored computer network interacts with a second entity that is associated with the respective node, where the first entity may be considered as a subject entity and the second entity may be considered as an object entity. The one or more predefined events may include ones where the subject entity, the object entity, or the interaction therebetween may be considered critical or otherwise relevant for monitoring via operation of the node monitored by the sensor 12-k. In an example, the one or more predefined events may include one or more of the following:

(any) one or more interactions carried out by one or more predefined subject entities operating in the respective node, (any) interactions subjected to one or more predefined object entities associated with the respective node, one or more predefined interactions between a(ny) pair of a subject entity and an object entity, e.g. ones that may be considered critical or otherwise relevant for monitoring via operation of the sensor 12-k.

Non-limiting examples of the subject entities considered in the one or more predefined events include a process or a program executing in the respective node, a system or a service operating in the respective node, a user account of the respective node, etc. whereas non-limiting examples of the object entities considered in the one or more predefined events include a(nother) process or program of the respective node, a(nother) process or program executing in the respective node, an entity of a file system of the respective node, an entity of an operating system of the respective node such as a system registry or a system log, a library entity in the respective node such as a dynamic link library (DLL), a network host communicatively coupled to the respective node, etc.

Non-limiting examples of interactions considered in the one or more predefined events include respective interactions between a process or program executing in the respective node with an object entity, e.g. one or more of the following:

one or more inter-process events, where an inter-process event involves a process or program executing in the respective node interacting with another process or program in the respective node;

one or more file system events, where a file system event involves a process or program executing in the respective node interacting with an element of a file system in the respective node;

one or more network events, where a network event involves a process or program in the respective node interacting with a network host.

As more detailed examples of the exemplifying processes-related events described above, an inter-process event may involve a first process in the respective node creating a second process for execution in the respective node or the first process modifying operation of the second process executing in the respective node. A file system event may involve a process in the respective node interacting with a file or a folder of the file system in the respective node, e.g. the respective process reading from or writing to a file or a folder of the file system in the respective node. A network event may involve a process of the respective node interacting with another node of the monitored computer network or a process of the respective node interacting with a node that is outside the monitored network, where the interaction may comprise the respective process transmitting information to the network host and/or receiving information from the network host.

Further non-limiting examples of interactions considered in the one or more predefined events include operating system manipulation events that involve a subject entity modifying a content of an operating system entity (such as the system registry or the system log) of the respective node, operating system access events that involve a subject entity accessing an operating system entity (such as the system registry or the system log) of the respective node, system events that involve a system or service executing in the respective node interacting with the object entity, user-initiated events that pertain to an user account of the respective node interacting with the object entity, etc.

Hence, each of the one or more predefined events may considered as one that involves a subject entity carrying out the respective interaction with an object entity and, consequently, information recorded in the data collected by the sensor 12-*k* in response to observing an occurrence of any of the one or more predefined events in the monitored node may involve an identification of the subject entity of the respective interaction, an identification of the object entity of the respective interaction and characterization of the interaction between the subject entity and the object entity. Along the lines described above, typically but not necessarily, a subject entity of an interaction may comprise a user-initiated process or an operating system (OS) process executing in the respective node, such as a program executing in the respective node or a thread of such a program, a system or service executing in the respective node, a user account of the respective node, etc., whereas an object entity of the interaction may comprise another process or program executing in the respective node, another system or service executing in the respective node, a file or a folder in the file system of the respective node, an operating system entity in the respective node, a library object in the respective node, a network host within the monitored network or outside the monitored network, etc.

Figure 2:
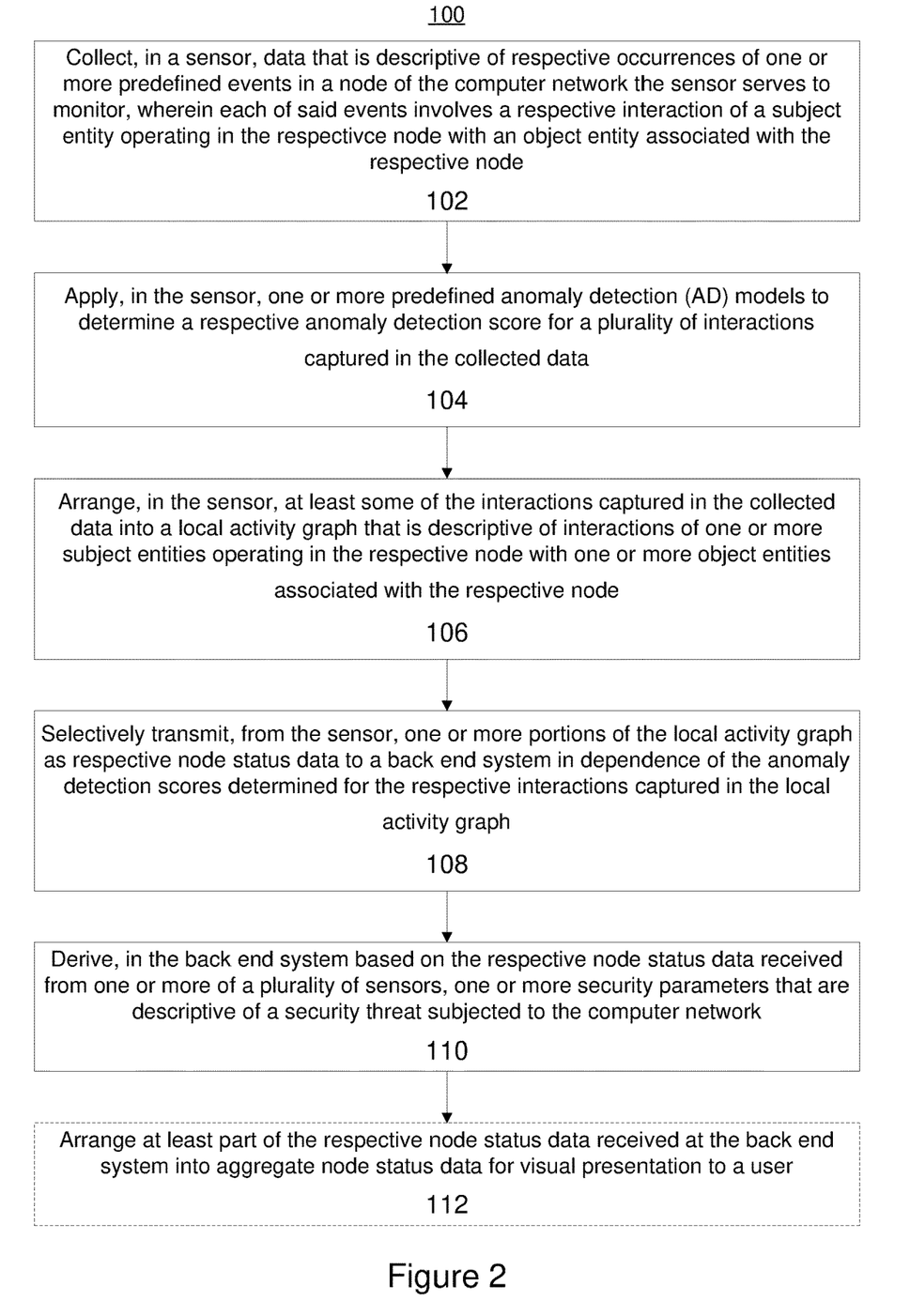
FIG. 2 illustrates a method according to an example.

Referring now back to operations described for block 104 of FIG. 2, each of the one or more predefined AD models may directly or indirectly define e.g. one or more of the following for at least one of the one or more predefined events under consideration via operation of the respective sensor 12-*k*:
- one or more expected interactions to be carried out between a certain pair of a subject entity and an object entity,
- one or more expected interactions to be carried out by a certain subject entity,
- one or more expected interactions to be subjected to a certain object entity,
- one or more expected pairs of a subject entity and an object entity for a certain interaction,
- one or more expected subject entities for carrying out a certain interaction,
- one or more expected object entities for a certain interaction.

Consequently, the one or more predefined AD models may be applied to detect unexpected or anomalous interaction between a subject entity operating in the respective node and an object entity associated with the respective node, where the anomalousness may pertain to the subject entity of the respective interaction, to the object entity of the respective interaction and/or to characteristics of the respective interaction.

The one or more predefined AD models may be determined based on data collected in the respective node of the monitored computer network, in a corresponding node of the monitored computer network, or in a corresponding node of a corresponding computer network in controlled operating environment that is known to be free of security threats subjected thereto, the one or more predefined AD models thereby representing expected (e.g. normal) interaction between respective entities in the respective node. Application of predefined AD models for detection of anomalous events is known in the art and the one or more predefined AD models applied in context of the present disclosure may be derived using any suitable technique known in the art. As non-limiting examples in this regard, e.g. a survey of various AD techniques is provided in Aggarwal, C. C. (2017); An introduction to Outlier Analysis; In: Outlier Analysis; Springer, Cham; ISBN 978-3-319-47577-6, whereas an example of specific technique applicable for detecting anomalous events is found in Das, K., Schneider, J. (2007, August); Detecting anomalous records in categorical datasets; Proceedings of the 13th ACM SIGKDD international conference on Knowledge discovery and data mining; pp. 220-229.

Application of the AD model for the observed occurrences of the one or more predefined events captured in the collected data (cf. block 102) may result in obtaining respective anomaly detection scores for the respective interactions between one or more pairs of a subject entity operating in the respective node and an object entity that is associated with the respective node. In this regard, an anomaly detection score may be descriptive of an extent of anomalousness of the respective interaction under consideration in a predefined scale. In an example, the anomaly detection score may increase with increasing anomalousness of the interaction under consideration, whereas in another example the anomaly detection score may decrease with increasing anomalousness of the interaction under consideration.

Referring now back to operations described for block 106 of FIG. 2, arrangement of at least some of the interactions captured in the collected data (cf. block 102) into information that defines the local activity graph may involve combining and/or transforming information recorded based on the occurrences of the one or more predefined events captured in the collected data into vertices and edges of the local activity graph: an edge connecting two vertices of the local activity graph may represent an interaction involving the respective entities represented by these two vertices, where the edge is directed from the vertex that represents the subject entity of the respective interaction to the vertex that represents the object entity of the respective interaction. In an example, the respective anomaly detection scores determined for the interactions represented by respective edges of the local activity graph may be introduced to the local activity graph, e.g. as weights assigned to the respective edges of the local activity graph.

A vertex that represents a subject entity of a certain interaction may also present an object entity of another interaction and, vice versa, a vertex that represents an object entity of a certain interaction may also represent a subject entity of another interaction. Hence, the local activity graph may serve to model respective interactions of a plurality of subject entities operating in the respective node of the monitored computer network with a plurality of object entities that are associated with the respective node.

In this regard, it is worth noting that the present disclosure applies the term "node" to refer to an element of the monitored computer network, whereas the term "vertex" is chosen to represent elements of the local activity graph linked to each other by the edges of the local activity graph. Hence, even though some sources apply the term "node" to refer to elements of an activity graph, the above-described choice of terminology applies throughout the present disclosure.

Referring now back to operations described for block 108 of FIG. 2, the aspect of selectively transmitting one or more portions of the local activity graph as the respective node status data from the sensor 12-*k* to the back end system 16 may comprise the sensor 12-*k* transmitting one or more sub-graphs of the local activity graph chosen in view of the anomaly detection scores determined for the respective interactions captured in the local activity graph. In this regard, the sensor 12-*k* may select one or more interactions recorded in the local activity graph based on the anomaly detection scores determined for the respective interactions and transmit, to the back end system 16, node status data that defines the selected portions of the local activity graph.

Conversely, the back end system 16 may receive the respective node status data from the plurality of sensors 12.

Selection of the node status data based on the anomaly detection scores may involve selection of those interactions for which the respective anomaly detection score indicates an extent of anomalousness that exceeds a predefined anomaly threshold: in a scenario where the anomaly detection score increases with increasing anomalousness of the interaction under consideration, this may involve selecting those interactions of the local activity graph having an anomaly detection that exceeds the anomaly threshold, whereas in a scenario where the anomaly detection score decreases with increasing anomalousness of the interaction under consideration, this may involve selecting those interactions of the local activity graph having an anomaly detection that is smaller than the anomaly threshold.

The node status data transmitted from the sensor 12-$k$ to the back end system 16 may comprise, for each interaction selected for inclusion to the node status data, information that identifies or defines the following:
the subject entity of the respective the interaction,
the object entity of the respective interaction
characteristic of the respective interaction.

In an example, the node status data transmitted from the sensor 12-$k$ to the back end system 16 may include the one or more selected portions of the local activity graph, e.g. one or more sub-graphs of the local activity graph without the anomaly detection scores derived therefor, whereas in another example the node status data transmitted from the sensor 12-$k$ to the back end system 16 may include the one or more selected portions of the local activity graph, e.g. one or more sub-graphs of the local activity graph together with the anomaly detection scores determined for those interactions that are selected for transmission to the back end system 16 as part of the node status data.

The sensor 12-$k$ may evaluate the need to transmit the node status data substantially continuously and transmit the node status data substantially without a delay in response to identifying one or more portions (e.g. one or more sub-graphs) of the local activity graph for which the determined anomaly detection scores indicate a threshold-exceeding extent of anomalousness. In an example, this may be accomplished via the sensor 12-$k$ scanning the local activity graph in view of the most recently derived anomaly detection scores according to a predefined schedule (e.g. at predefined time intervals) in order to identify the one or more portions of the local activity graph for which the determined anomaly detection scores indicate the threshold-exceeding extent of anomalousness, whereas in another example the sensor 12-$k$ may carry out such scanning in response to having recorded a predefined number (e.g. one) of new interactions since the most recent previous scan.

Referring now back to operations described for block 110 of FIG. 2, according to an example, derivation of the one or more security parameters that are descriptive of the security threat (possibly) subjected to the monitored computer network may comprise deriving at least an indication of one of presence or absence of a security threat pertaining to the monitored computer network based on the respective node status data received from one or more sensors 12-$k$ arranged to monitor respective nodes of the monitored computer network. In this regard, the back end system 16 determining one of presence or absence of a security threat may be based on the one or more sensors 12-$k$ reporting anomalous interactions having been detected therein and/or based on respective characteristic of the anomalous interactions reported by the one or more sensors 12-$k$, thereby enabling determination that accounts for the volume of the anomalous activity detected across the nodes of the monitored computer network and/or for type of anomalous activity detected within the monitored computer network. An advantage of such an approach is that a significant amount of computation required for detecting anomalous activity is carried out in the plurality of sensors 12 arranged for monitoring respective nodes of the computer network while setting a relaxed computation requirement for the back end system 16 without substantially compromising the capability to detect possible security threats within the monitored computer network.

The back end system 16 may, optionally, take further action in dependence of the one or more security parameters derived therein based on the respective node status data received from one or more sensors 12-$k$. In an example where the one or more security parameters comprise an indication of one of presence or absence of a security threat in the monitored computer network, the back end system 16 may issue an alert and/or take predefined action for mitigating or eliminating the security threat in response to detecting presence of a security threat and/or the back end system 16 may continue monitoring without further specific action in response to detecting absence of a security threat.

Referring back to FIG. 2, the method 100 may, optionally, further comprise arranging at least part of the respective node status data received from the plurality of sensors 12 into aggregate node status data for visual presentation to a user (block 112). In this regard, the back end system 16 may store the respective node status data received from the plurality of sensors 12 to the memory accessible by the back end system 16 for subsequent determination of the aggregate node status data and for visual presentation of the aggregate node status data to the user. The respective node status data received at the back end system 16 from the plurality of sensors 12 may be stored with a timing information that indicates the time of deriving the respective node status data at the respective sensor 12-$k$ and/or the time of reception of the respective node status data at the back end system 16. In this regard, the timing information may comprise a respective timestamp that indicates respective timing in relation to a predefined reference time.

The back end system 16 may determine the aggregate node status data in response to a request and it may be presented to the user via a display device provided in or coupled to the back end system 16. Alternatively or additionally, the aggregate node status data may be transmitted to another apparatus for visual presentation to the user via a display device provided therein. In an example, the request may be automatically generated, e.g. in response to the back end system 16 determining presence of a security threat that pertains to the monitored computer network and/or in response to the back end system 16 being unable to determine one of presence or absence of a security threat, whereas in another example the request may be received from a user e.g. via a user interface (UI) of the back end system 16 or via a communication interface provided in the back end system 16. The request to derive the aggregate node status data for visual presentation to the user may indicate a time instant or a time window and the back end system 16 may derive the aggregate node status data via combining the respective node status data stored with timing information that matches the time instant or the time window specified in the request, thereby providing a temporal snapshot of the nodes status data that represents possible anomalous activity within the monitored computer network.

The aggregate node status data may be arranged in a form of an aggregate activity graph, which may be obtained via combining respective subgraphs received in respective node status data from one or more sensors 12-k. In this regard, each vertex of the aggregate activity graph may represent a subject entity operating in one of the nodes of the monitored computer network and/or an object entity associated with one of the nodes of the monitored computer network, whereas each edge connecting two vertices of the aggregate activity graph may represent an interaction that involves the respective subject and object entities represented by these two vertices, where the respective edge is directed from the subject entity of the respective interaction to the object entity of the respective interaction. Hence, the aggregate activity graph may model respective interactions of one or more subject entities operating one of the nodes of the monitored computer network with one or more object entities associated with one of the nodes of the monitored computer network.

Figure 3:
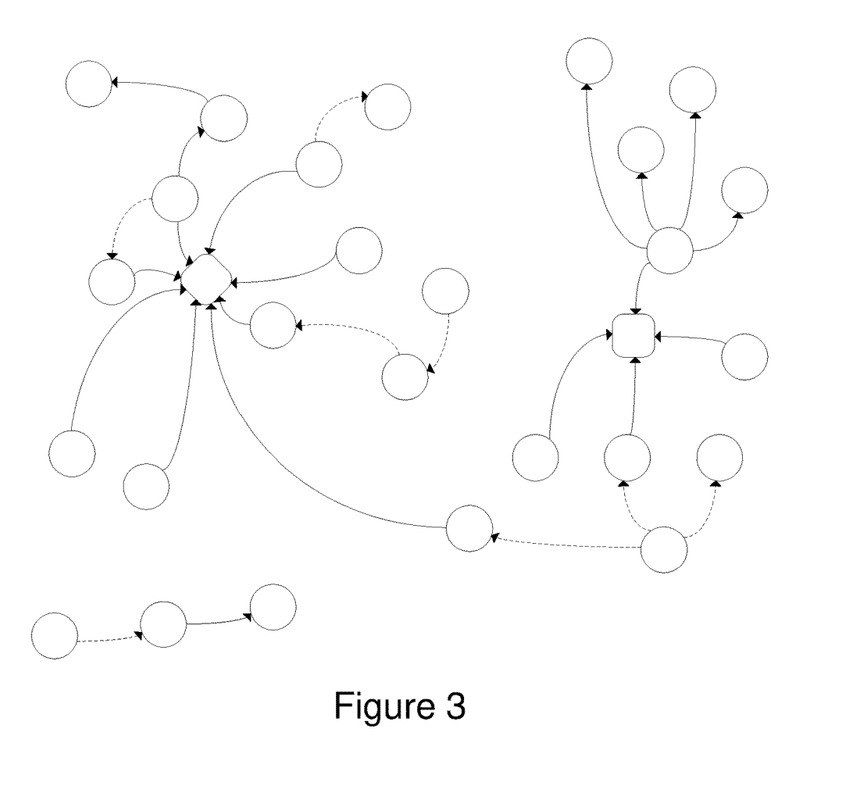
FIG. 3 illustrates a visual presentation of the aggregate node status data according to an example.

FIG. 3 depicts an illustrative and non-limiting example of a visual presentation of the aggregate node status data in a form of the aggregate activity graph. Therein, vertices shown as circles represent respective processes or programs that are executing in one of the nodes of the monitored computer network, vertices shown as rectangles represent elements of a file system in one of the nodes of the monitored computer network, and vertices shown as diamonds represent network hosts communicatively coupled to at least one of the nodes of the monitored computer network. Moreover, edges directed from one vertex shown as a circle to another represent inter-process events with solid lines representing process creation events and dashed lines representing process modification or manipulation events, edges directed from a vertex shown as a circle to a vertex shown as a rectangle represent file system events and edges directed from a vertex shown as a circle to a vertex shown as a diamond represent network events. In an example, the visual presentation of the aggregate activity graph may be further provided with information (e.g. text and/or symbols) that identifies, for at least some of the vertices, the respective subject and/or object entity represented by the respective vertex.

Still referring to the example of FIG. 3, the interactions represented by the aggregate activity graph shown therein may all represent activity in a respective node of the monitored computer network via operation of the respective sensor 12-k, whereas the aggregate activity graph according to the example of FIG. 3 may not provide any indication of relative extent of anomalousness of the interactions captured in the aggregate activity graph with respect to each other. Nevertheless, the aggregate activity graph according to the example of FIG. 3 provides further insight of interactions observed in one or more nodes of the monitored computer network that facilitate analysis of a security threat possibly pertaining to the monitored computer network.

In a further example, assuming that the node status data received at the back end system 16 from the sensors 12-k may include also the anomaly detection scores determined for the respective one or more portions (e.g. one or more sub-graphs) of the local activity graph in the respective sensor 12-k, the visual presentation of the aggregate node status data may further include visual information that is descriptive of the respective extent of anomalousness represented by the interactions captured in the aggregate node status data, where the visual information pertaining to the anomalousness of the interactions shown in the visual representation may be derived based on the anomaly detection scores received in the respective node status data originating from the sensors 12-k.

Figure 4:
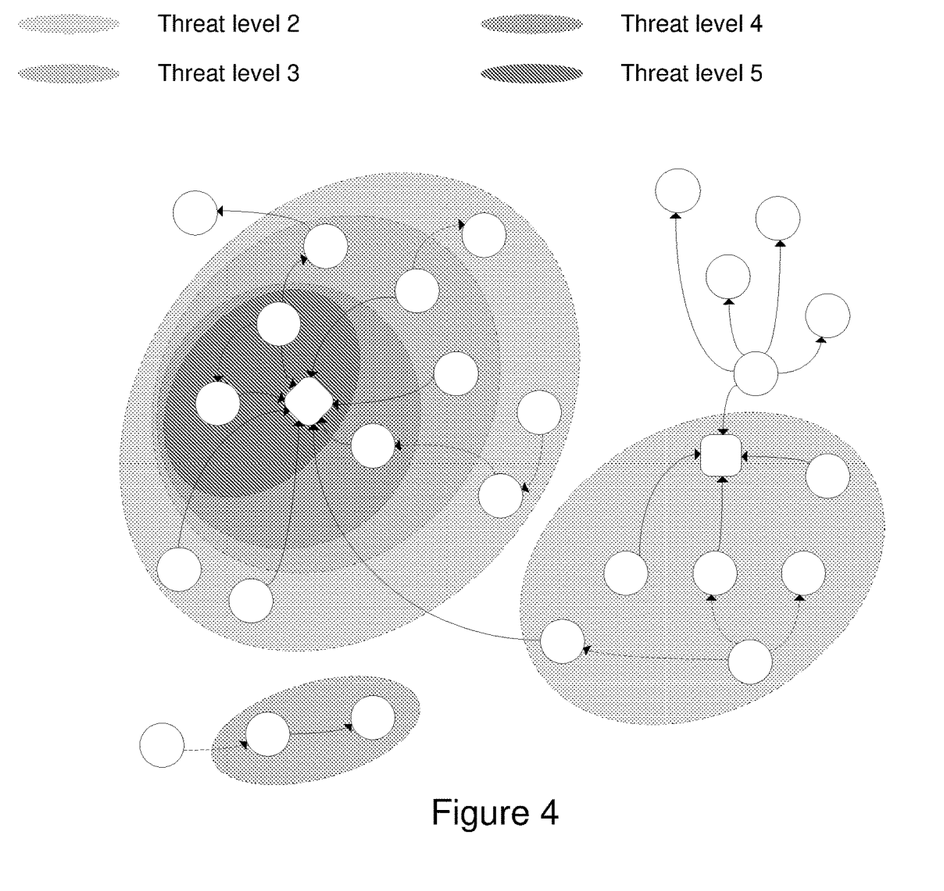
FIG. 4 illustrates a visual presentation of the aggregate node status data according to an example.

FIG. 4 depicts an illustrative and non-limiting example of a visual presentation of the aggregate node status data in a form of the aggregate activity graph with the visual information that is descriptive of the respective extent of anomalousness represented by the interactions captured in the aggregate activity graph. Therein, the interactions captured in the aggregate activity graph are shown on a background having at least one visual characteristics that is descriptive of the anomaly detection score obtained for the respective interaction. In this regard, the anomaly detection scores may be divided into two or more ranges, where each range is assigned a respective background characteristics that is different from the respective background characteristics of the other ranges. In the example of FIG. 4 the visual background characteristics include different intensities of the grey color, where interactions at the lowest threat level (e.g. level 0) are shown without on a white background while the increasing threat levels from level 2 to level 5 are indicated using increased intensity of grey background color. In other examples, e.g. backgrounds of different colors or different patterns may be applied to indicate different threat levels.

In another approach of visually presenting the extent of anomalousness of interactions captured in the aggregate activity graph, respective appearances of at least some vertices and/or edges of the aggregate activity graph may be applied as the visual indication of the extent of anomalousness of the interactions they serve to represent. As an example in this regard, at least some vertices of the aggregate activity graph may be depicted in size and/or in color that is descriptive of the anomaly detection score derived for the interaction the respective vertices serve to represent, whereas in another example at least some edges of the aggregate activity graph may be depicted in thickness and/or in color that is descriptive of the anomaly detection score derived for the interaction the respective edge serves to represent. In a further approach of visually presenting the extent of anomalousness of interactions captured in the aggregate activity graph, at least some edges of the aggregate activity graph may be provided with numbers, symbols and/or text that is descriptive of the anomaly detection score derived for the interaction the respective edge serves to represent.

Such selective visualization of the extent of anomalousness of the interactions within the monitored computer network enables highlighting interactions of certain extent of anomalousness, which may facilitate reliable and timely analysis of a security threat possibly pertaining to the monitored computer network regardless of the applied manner of visualizing the anomaly detection scores.

In the above examples that refer to FIGS. 3 and 4 an implicit assumption is that aggregate activity graph serving as the visual presentation of the aggregate node status data includes respective illustrations of all interactions reported by the sensors 12-k in the respective node status data transmitted to the back end system 16. In other examples, the aggregate activity graph (or another form of visual presentation of the aggregate node status data) may include only those interactions for which the respective anomaly detection score fulfills one or more event visualization criteria. In this regard, the one or more event visualization criteria may define visualization of only those interactions for which the respective anomaly detection score indicates an extent of anomalousness that exceeds a lower event visualization threshold and/or that is smaller than an upper event visualization threshold. Herein, the one or more event visualization criteria (e.g. the lower and/or the upper event visualization thresholds) may be predefined or use-defined ones and/or they may be specified in the request to derive the aggregate node status data for visual presentation to the user. Such selective visualization of interactions within the monitored computer network enables focusing the analysis to interactions of certain extent of anomalousness, which may facilitate reliable and timely analysis of a security threat possibly pertaining to the monitored computer network.

In the above examples that involve visual information that is descriptive of the respective extent of anomalousness of the interactions captured in the aggregate activity graph, such information may be provided for the interactions illustrated in the aggregate activity graph regardless of the respective anomaly detection scores derived therefor. In other examples, the visual information that is descriptive of the respective extent of anomalousness of the interactions captured in the aggregate activity graph may be provided only for those interactions for which the respective anomaly detection score fulfills one or more anomaly score visualization criteria. In this regard, the one or more anomaly score visualization criteria may define visualization of respective anomaly detection scores for only those interactions for which the respective anomaly detection score indicates an extent of anomalousness that exceeds a lower anomaly score visualization threshold and/or that is smaller than an upper anomaly score visualization threshold. Herein, the one or more anomaly score visualization criteria (e.g. the lower and/or the upper anomaly score visualization thresholds) may be predefined or use-defined ones and/or they may be specified in the request to derive the aggregate node status data for visual presentation to the user. Such selective visualization of anomaly detection scores enables emphasizing interactions of certain extent of anomalousness, which may facilitate reliable and timely analysis of a security threat possibly pertaining to the monitored computer network.

Figure 5:
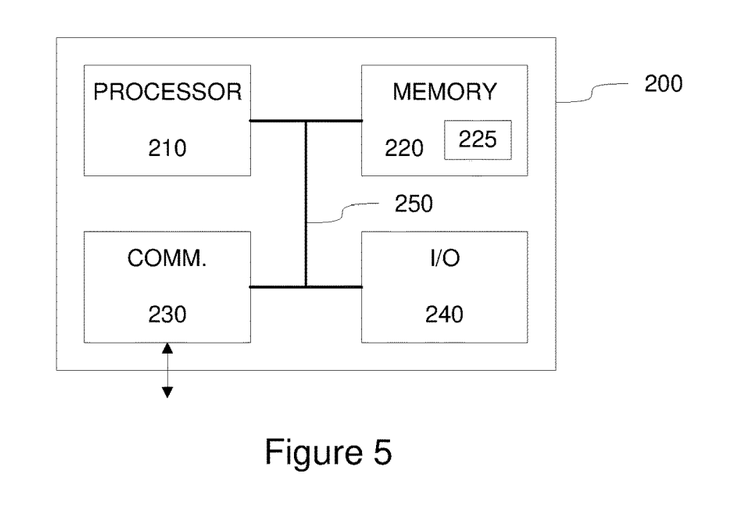
FIG. 5 illustrates a block diagram of some components of an apparatus according to an example.

FIG. 5 illustrates a block diagram of some components of an apparatus 200 that may be employed to implement at least some of the operations described in the foregoing with references to the sensor 12-$k$ or to the back end system 16. In respective examples, the apparatus 200 may be employed to implement the sensor 12-$k$ or the back end system 16 or the apparatus 200 may be employed as one of the apparatuses that serve to implement the back end system 16. The apparatus 200 comprises a processor 210 and a memory 220. The memory 220 may store data and computer program code 225. The apparatus 200 may further comprise communication means 230 for wired or wireless communication with other apparatuses and/or user I/O (input/output) components 240 that may be arranged, together with the processor 210 and a portion of the computer program code 225, to provide the user interface for receiving input from a user and/or providing output to the user. In particular, the user I/O components may include user input means, such as one or more keys or buttons, a keyboard, a touchscreen or a touchpad. The user I/O components may include output means, such as a display or a touchscreen. The components of the apparatus 200 are communicatively coupled to each other via a bus 250 that enables transfer of data and control information between the components.

The memory 220 and a portion of the computer program code 225 stored therein may be further arranged, with the processor 210, to cause the apparatus 200 to perform at least some aspects of operation of the sensor 12-$k$ or the back end system 16. The processor 210 is configured to read from and write to the memory 220. Although the processor 210 is depicted as a respective single component, it may be implemented as respective one or more separate processing components. Similarly, although the memory 220 is depicted as a respective single component, it may be implemented as respective one or more separate components, some or all of which may be integrated/removable and/or may provide permanent/semi-permanent/dynamic/cached storage.

The computer program code 225 may comprise computer-executable instructions that implement at least some aspects of operation of the sensor 12-$k$ or the back end system 16 when loaded into the processor 210. As an example, the computer program code 225 may include a computer program consisting of one or more sequences of one or more instructions. The processor 210 is able to load and execute the computer program by reading the one or more sequences of one or more instructions included therein from the memory 220. The one or more sequences of one or more instructions may be configured to, when executed by the processor 210, cause the apparatus 200 to perform at least some aspects of operation of the sensor 12-$k$ or the back end system 16. Hence, the apparatus 200 may comprise at least one processor 210 and at least one memory 220 including the computer program code 225 for one or more programs, the at least one memory 220 and the computer program code 225 configured to, with the at least one processor 210, cause the apparatus 200 to perform at least some aspects of operation of the sensor 12-$k$ or the back end system 16.

The computer program code 225 may be provided e.g. as a computer program product comprising at least one computer-readable non-transitory medium having the computer program code 225 stored thereon, which computer program code 225, when executed by the processor 210 causes the apparatus 200 to perform at least some aspects of operation of the sensor 12-$k$ or the back end system 16. The computer-readable non-transitory medium may comprise a memory device, a record medium or another article of manufacture that tangibly embodies the computer program. As another example, the computer program may be provided as a signal configured to reliably transfer the computer program.

Reference(s) to a processor herein should not be understood to encompass only programmable processors, but also dedicated circuits, such as field-programmable gate arrays (FPGA), application-specific integrated circuits (ASIC) and signal processors. Features described in the preceding description may be used in combinations other than the combinations explicitly described.

The invention claimed is:

1. A threat detection network for monitoring a security threat pertaining to a computer network, the threat detection network comprising a back end system and a plurality of sensors coupled to the back end system via a communication network, wherein each sensor is arranged to:

collect data that is descriptive of respective occurrences of one or more predefined events in a respective one of a plurality of nodes of the computer network, wherein each of said events involves a respective interaction of a subject entity operating in the respective node with an object entity associated with the respective node, apply one or more predefined anomaly detection (AD) models to determine respective anomaly detection scores for a plurality of interactions captured in the collected data, arrange at least some of the interactions captured in the collected data into a local activity graph comprising interactions between plural subject entities operating in the respective node with one or more object entities associated with the respective node, and selectively transmit, from the sensor, one or more portions of the local activity graph as respective node status data to the back end system, the one or more portions chosen in dependence of the anomaly detection scores determined for the respective interactions captured in the local activity graph, the one or more portions comprising sub-graphs of the local activity graph; and wherein the back end system is arranged to derive, based on respective node status data received from one or more of said plurality of sensors, one or more security parameters that are descriptive of the security threat pertaining to the computer network.

2. The threat detection network according to claim 1, wherein the one or more predefined events include one or more of the following:
one or more events that involve an interaction carried out by a respective predefined subject entity operating in the respective node,
one or more events that involve an interaction subjected to a respective predefined object entity associated with the respective node,
one or more events that involve a respective predefined interaction carried out by a subject entity operating in the respective node and subjected to an object entity associated with the respective node.

3. The threat detection network according to claim 2, wherein the sensor is arranged to combine detected occurrences of the one or more predefined events into information that defines the local activity graph comprising:
a plurality of vertices that each represent a subject entity operating in the respective node and/or an object entity associated with the respective node; and
a plurality of edges that each connect a first vertex to a second vertex and represent an interaction subjected by the subject entity represented by the first vertex to an object entity represented by the second vertex.

4. The threat detection network according to claim 2, wherein the anomaly detection score determined for a certain interaction is descriptive of the extent of anomalousness of the respective interaction.

5. The threat detection network according to claim 2, wherein said node status data comprises information that defines those one or more parts of the local activity graph for which the respective anomaly detection scores indicate an extent of anomalousness that exceeds a predefined anomaly threshold.

6. The threat detection network according to claim 1, wherein the sensor is arranged to combine detected occurrences of the one or more predefined events into information that defines the local activity graph comprising:
a plurality of vertices that each represent a subject entity operating in the respective node and/or an object entity associated with the respective node; and
a plurality of edges that each connect a first vertex to a second vertex and represent an interaction subjected by the subject entity represented by the first vertex to an object entity represented by the second vertex.

7. The threat detection network according to claim 6, wherein the anomaly detection score determined for a certain interaction is descriptive of the extent of anomalousness of the respective interaction.

8. The threat detection network according to claim 6, wherein said node status data comprises information that defines those one or more parts of the local activity graph for which the respective anomaly detection scores indicate an extent of anomalousness that exceeds a predefined anomaly threshold.

9. The threat detection network according to claim 1, wherein the anomaly detection score determined for a certain interaction is descriptive of the extent of anomalousness of the respective interaction.

10. The threat detection network according to claim 9, wherein anomalousness of the respective interaction may pertain to the subject entity of the respective interaction, the object entity of the respective interaction and/or to characteristics of the respective interaction.

11. The threat detection network according to claim 1, wherein said node status data comprises information that defines those one or more parts of the local activity graph for which the respective anomaly detection scores indicate an extent of anomalousness that exceeds a predefined anomaly threshold.

12. The threat detection network according to claim 1, wherein the node status data further comprises the anomaly detection scores derived for said one or more portions of the local activity graph.

13. The threat detection network according to claim 1, wherein the back end system is arranged to determine, based on the respective node status data received from the one or more of the plurality of sensors, a security parameter that indicates one of presence or absence of the security threat pertaining to the computer network.

14. The threat detection network according to claim 1, wherein the back end system is arranged to combine the respective node status data received from the one or more of the plurality of sensors into aggregate node status data for visual presentation to a user.

15. The threat detection network according to claim 14, wherein the aggregate node status data comprises an aggregate activity graph that is descriptive of interactions by a plurality of processes executing in one of said plurality of nodes of the computer network.

16. The threat detection network according to claim 15, wherein the aggregate activity graph comprises:
a plurality of vertices that each represent a subject entity operating in one of the plurality of nodes of the computer network and/or an object entity associated with one of the plurality of nodes of the computer network, and
a plurality of edges that each connect a first vertex to a second vertex and represent interaction subjected by an entity represented by the first vertex to an entity represented by the second vertex.

17. The threat detection network according to claim 15, wherein the aggregate activity graph comprises respective visual presentations of the extent of anomalousness of at least some of the interactions defined in the aggregate activity graph.

18. The threat detection network according to claim 15, wherein the aggregate activity graph comprises respective representation of those interactions across said plurality of nodes of the computer network for which the respective anomaly detection scores indicate an extent of anomalousness that fulfills one or more event visualization criteria.

19. A method for monitoring a security threat pertaining to a computer network, wherein the threat detection network comprises a back end system and a plurality of sensors coupled to the back end system via a communication network,
wherein the method comprises, in said plurality of sensors, the following:
collecting, in a respective sensor, data that is descriptive of respective occurrences of one or more predefined events in a respective one of a plurality of nodes of the computer network, wherein each of said events involves a respective interaction of a subject entity operating in the respective node with an object entity associated with the respective node, applying, in the respective sensor, one or more predefined anomaly detection (AD) models to determine a respective anomaly detection score for a plurality of interactions captured in the collected data, arranging, in the respective sensor, at least some of the interactions captured in the collected data into a local activity graph comprising interactions between plural subject entities operating in the respective node with one or more object entities associated with the respective node, and selectively transmitting, from the respective sensor, one or more portions of the local activity graph as respective node status data to the back end system, the one or more sub-graphs chosen in dependence of the detection anomaly scores determined for the respective interactions captured in the local activity graph, the one or more portions comprising sub-graphs of the local activity graph; and wherein the method further comprises deriving, in the back end system, based on respective node status data received from one or more of said plurality of sensors, one or more security parameters that are descriptive of the security threat pertaining to the computer network.

\* \* \* \* \*